US006544325B2

(12) United States Patent
Hall-Goulle et al.

(10) Patent No.: US 6,544,325 B2
(45) Date of Patent: Apr. 8, 2003

(54) PIGMENTARY COPPER PHTHALOCYANINE SOLID SOLUTION AND TRANSPARENT DISPERSION COMPRISING IT

(75) Inventors: Véronique Hall-Goulle, Reinach (CH); Gerardus De Keyzer, Riehen (CH); Yves Grandidier, Antibes (FR)

(73) Assignee: Ciba Specialty Chemicals Corporation, Tarrytown, NY (US)

( * ) Notice: Subject to any disclaimer, the term of this patent is extended or adjusted under 35 U.S.C. 154(b) by 0 days.

(21) Appl. No.: 09/898,414

(22) Filed: Jul. 3, 2001

(65) Prior Publication Data

US 2002/0014183 A1 Feb. 7, 2002

(30) Foreign Application Priority Data

Jul. 7, 2000  (CH) ................................ 1345/00
Aug. 28, 2000  (CH) ................................ 1673/00

(51) Int. Cl.$^7$ ......................... C09B 67/50; C09B 67/22
(52) U.S. Cl. ................. 106/410; 106/411; 106/412; 106/413; 106/493; 106/494; 106/495; 106/496; 106/497; 106/498; 430/7
(58) Field of Search ................ 106/410, 411, 106/412, 413, 493, 494, 495, 496, 497, 498; 430/7

(56) References Cited

U.S. PATENT DOCUMENTS

| | | | | |
|---|---|---|---|---|
| 2,556,728 A | | 6/1951 | Graham ................... 260/314.5 |
| 4,077,972 A | * | 3/1978 | Baurecht et al. ............. 540/136 |
| 4,135,944 A | | 1/1979 | Wheeler ...................... 106/288 |
| 4,350,534 A | * | 9/1982 | Fechner et al. ............. 106/411 |
| 4,548,968 A | * | 10/1985 | Jaffe ........................... 524/562 |
| 5,248,336 A | | 9/1993 | Gerson et al. .............. 106/411 |
| 5,281,268 A | * | 1/1994 | Ganci et al. ................ 106/400 |
| 5,472,496 A | | 12/1995 | Hendi et al. ................ 106/495 |
| 5,618,343 A | * | 4/1997 | Hendi et al. ................ 106/404 |
| 5,821,373 A | | 10/1998 | Hao et al. ................... 548/453 |
| 6,280,890 B1 | | 8/2001 | Sawamura et al. ............ 430/7 |
| 6,368,399 B1 | * | 4/2002 | Aoba et al. ............... 106/31.78 |

FOREIGN PATENT DOCUMENTS

| | | |
|---|---|---|
| DE | 1181248 | 11/1964 |
| EP | 101 163 | * 2/1984 |
| EP | 719 842 | * 7/1996 |
| EP | 0803545 | 10/1997 |
| EP | 0808878 | 11/1997 |
| GB | 1411880 | 10/1975 |
| JP | 48-076925 | * 10/1973 |
| JP | 49-059136 | * 6/1974 |
| JP | 51-054622 | * 5/1976 |
| JP | 52-008030 | * 1/1977 |
| JP | 61-266471 | 11/1986 |
| JP | 7-198925 | 8/1995 |
| JP | 2000-281924 | 10/2000 |
| WO | 99/54410 | 10/1999 |

OTHER PUBLICATIONS

SciFinder Abstr. for JP 08044056 (Feb. 1996).
Derwent Abst. 1997:388615 for JP 09095638 (Apr. 1997).
Derwent Abst. 92–252273 for JP 04252273 (Sep. 1992).

* cited by examiner

*Primary Examiner*—Anthony J. Green
(74) *Attorney, Agent, or Firm*—David R. Crichton

(57) ABSTRACT

The present invention relates to pigmentary solid solutions comprising copper phthalocyanine (Pigment Blue 15; C.I. 74160) as host and other blue to violet pigments as guests. Preferred hosts are the α (Pigment Blue 15:1), β (Pigment Blue 15:3) and ε (Pigment Blue 15:6) crystal forms of copper phthalocyanine, especially the ε crystal form. The present invention also relates to dispersions comprising solid solutions as pigment particles, and pigment derivatives as rheology improvers. Preferred dispersions of solid solutions in the e crystal lattice may be used in particular to prepare color filters for liquid-crystal displays (LCDs). The present invention also includes a process for preparing the dispersions of the invention, the solid solutions themselves, and the use thereof to pigment high molecular mass organic materials.

40 Claims, 1 Drawing Sheet

PIGMENTARY COPPER PHTHALOCYANINE SOLID SOLUTION AND TRANSPARENT DISPERSION COMPRISING IT

The invention relates to pigmentary solid solutions comprising copper phthalocyanine (Pigment Blue 15; C.I. 74160) as host and other blue to violet pigments as guests. Preferred hosts are the α (Pigment Blue 15:1), β (Pigment Blue 15:3) and ε (Pigment Blue 15:6) crystal forms of copper phthalocyanine, especially the ε crystal form. Monophase solid solutions are preferred.

The invention also relates, furthermore, to dispersions comprising these solid solutions as pigment particles and pigment derivatives as rheology improvers. Preferred dispersions of solid solutions in the ε crystal lattice may be used in particular to prepare colour filters for liquid-crystal displays (LCDs) which in comparison to existing colour filters have an improved transmission window at 445±10 nm.

The correct position and the absolute value of the transmission window are the most important parameters for colour filters. There is a desire for high transmission in the wavelength range surrounding the light emission, coupled with as high as possible an absorption for different-coloured light. Normally, trichromatism is achieved by using one blue, one red and one green filter. These filters must be highly transparent, homogeneous and able to be prepared in a very uniform layer thickness.

Many blue filters are known and in some cases are available commercially. Some of them contain ε copper phthalocyanine (C.I. Pigment Blue 15:6) and carbazole violet (C.I. Pigment Violet 23). It has been found, however, that these filters are unable entirely to satisfy the present-day requirements. The aim of the invention is therefore to improve the blue filter.

It has repeatedly been disclosed that copper phthalocyanine (crude or in the α phase) is easily convertible into its β crystal form, for example in U.S. Pat. No. 2,556,728 by salt grinding with a solvent, in EP-0 803 545 by dry grinding followed by solvent treatment, in EP-0 808 878 by dry grinding with a solid binder in an inert atmosphere, and in WO-99/54410 by dry or aqueous grinding followed by conditioning.

On the other hand, GB-1,411,880 and JP-A-04/252 273 describe the conversion of α copper phthalocyanine first of all into a mixture of α and ε copper phthalocyanine in a ball mill and then into pure ε copper phthalocyanine by treatment with solvents at only moderately elevated temperature. These results are, however, hardly reproducible.

U.S. Pat. No. 4,135,944 explains that the formation of β or ε copper phthalocyanine is dependent not only on shear force, solvent and temperature but also on the presence of a suitable phthalocyanine derivative which determines the formation of the ε crystal phase.

Also apparently showing themselves to be determinants of the crystal phase, according to JP-A-48/76 925, are chlorinated copper phthalocyanines, which are processed together with pure α copper phthalocyanine to give a mixture whose x-ray diffraction pattern is very similar to that of ε copper phthalocyanine.

JP-A-09/95 638 and JP-A-08/44 056 describe the use in blue colour filters of physical mixtures of α and ε copper phthalocyanine and, respectively, of α copper phthalocyanine and dioxazine violet.

JP-A-61/266 471 discloses that the salt kneading of a copper phthalocyanine leads to the R or β form depending on whether it takes place in the presence or absence of a colourless reaction product of an aromatic isocyanate with an aliphatic amine.

JP-A-07/198 925 describes a 10% liquid dispersion of ε copper phthalocyanine, $SiO_2$ particles ("amorphous fumed silica") and dioxazine violet in N-methylpyrrolidone. However, no solid solution is formed: in contrast, the x-ray powder diagram of a dispersion in accordance with example 1 clearly contains the characteristic signals of ε copper phthalocyanine and those of dioxazine violet separately alongside one another.

The invention also differs in a number of important points from the applications WO-01/04215, WO-01/09252 and JP-A-2000/281924, still unpublished at the priority date. Surprisingly, unwanted phase transformations of copper phthalocyanine in the course of salt grinding may be prevented by adding pigments from a selection of classes. Even more surprisingly, solid solutions are obtained which exhibit improved coloristic properties.

Figure 1:
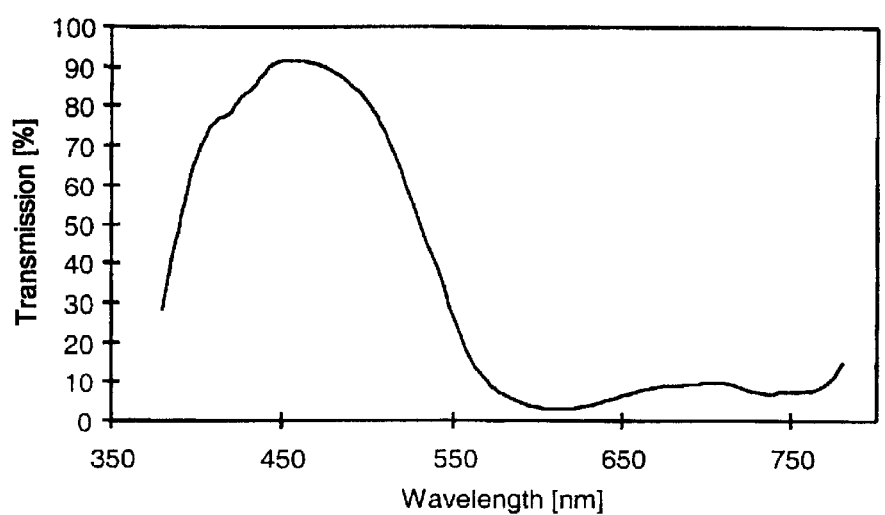
FIG. 1 shows the transmission spectrum for a color filter.

The invention may be used judiciously for all known crystal forms of copper phthalocyanine, for example the α, β, δ, γ, ε, ρ, π, X or R crystal form. Preference is given to the α, β and, in particular, the ε crystal form, from which the below-described novel dispersions for preparing improved blue colour filters are obtainable.

The invention provides a pigment dispersion comprising a pigment, a rheology improver and a high molecular mass organic material, wherein the pigment is a solid solution whose host is unsubstituted copper phthalocyanine and whose guest is a quinacridone, quinacridonequinone, dioxazine, indanthrone, indigo, isoviolanthrone, perylene, amino-substituted 1,4-diketo-2,5-diarylpyrrolo[3,4c]pyrrole or alkoxy-substituted Naphtol AS azo pigment; and the rheology improver is selected from the group consisting of quinacridone, dihydroquinacridone, quinacridonequinone, 1,1'-dianthraquinonyl, dioxazine, indanthrone, indigo, isoindolinone, isoviolanthrone, phthalocyanine and 1,4-diketo-pyrrolo[3,4c]pyrrole cores substituted by groups containing nitrogen or sulfur, and any desired mixtures thereof.

Preferably, unsubstituted copper phthalocyanine host is present in its α, β or ε crystal form, with particular preference in its ε crystal form.

These guest pigments are known to the person skilled in the art, for example, from the handbook "Industrial Organic Pigments" (W. Herbst & K. Hunger, VCH Weinheim 1993, ISBN 3-527-28161-4). Judiciously, the amount of guest pigment is from 0.1 to 50% by weight, based on the amount of copper phthalocyanine, preferably from 0.5 to 20% by weight, with particular preference up to 10% by weight, and in particular up to 5% by weight, especially from about 1 to about 3% by weight. Depending on the intended use, it is also possible for larger amounts of guest pigment to be preferred, especially for the purpose of use in paints. At appropriate molar ratios, mixed crystals may be formed instead of the solid solution, these crystals being likewise interpreted in the context of the invention as solid solutions and not as a special case. Preferred guests are quinacridone, dioxazine and indanthrone pigments.

Electron microscopy of the instant solid solutions shows crystals all of similar aspect, with a narrow particle size distribution. Thus, it is understood that substantially the whole amount of guest is present in the same particles as the host, host and guest forming a solid solution together. The x-ray powder diagrams show a unique crystal phase, too.

In the foreground are rheology improvers in which the core is substituted by from 1 to 4 groups —$SO_3H$, —$SO_2NR_5R_6$, —$SO_2$—$C_1$-$C_{10}$alkylene-$NR_5R_6$, or, in particular, —$SO_3^-M^+$, where $M^+$ is $^+NR_1R_2R_3R_4$ or an alkali metal cation or half an alkaline earth metal cation and $R_1$ to $R_6$ independently of one another are hydrogen, $C_1$-$C_{30}$alkyl, $C_5$-$C_{24}$cycloalkyl, $C_2$-$C_{30}$alkenyl, $C_7$-$C_{30}$arylalkyl, $C_6$-$C_{18}$aryl, $[C_2$-$C_5$alkylene-$O]_{1-10}H$, $[C_2$-$C_5$ alkylene-$O]_{1-10}C_1$-$C_5$alkyl, $[C_2$-$C_5$alkylene-$NH]_{1-10}H$ or $[C_2$-$C_5$alkylene-$NH]_{1-10}C_1$-$C_5$alkyl. Compounds containing $^+NR_1R_2R_3R_4$ are known, for example, under the trade name ®Arquad (Akzo B. V.).

Instead of the sulfonated derivatives it is also possible to use other derivatives, for example those obtained by reacting a pigment with formaldehyde and a secondary amine (Mannich reaction) to obtain a core substituted for example by from 1 to 4 groups —$CH_2NR_5R_6$,

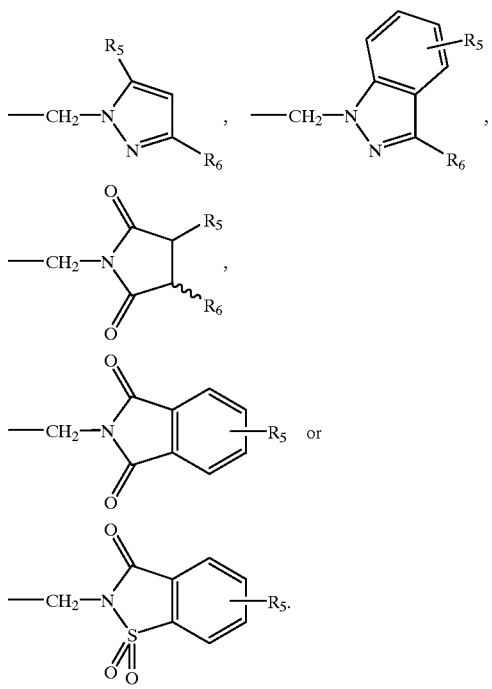

Further known rheology improvers may also be used, for example such wherein the core is substituted by —$NHSO_2R_5$, —$N(C_1$-$C_5$alkyl)$SO_2R_5$, —$NHSO_2$—$C_1$-$C_{10}$alkylene-$NR_5R_6$, —$N(C_1$-$C_5$alkyl)-$C_1$-$C_{10}$alkylene-$SO_2NR_5R_6$, —$NHCOR_5$, —$N(C_1$-$C_5$ alkyl)$COR_5$, —$NHCO$—$C_1$-$C_{10}$alkylene-$NR_5R_6$ or —$N(C_1$-$C_5$alkyl)-$C_1$-$C_{10}$alkylene-$CONR_5R_6$. Known rheology improvers may also be used which have different substituents on the same core.

In general, the amount of rheology improver is from 2 to 20% by weight, based on the total amount of pigment, preferably from 4 to 15% by weight, with particular preference from 6 to 12% by weight. The rheology improvers of the invention are known substances or may be prepared by known methods. Sometimes they are also referred to as synergists.

In one preferred embodiment, the dispersion of the invention further comprises a neutral nonionic dispersant in an amount of preferably from 5 to 200% by weight, based on the total amount of pigment, with particular preference from 10 to 80% by weight, and with very particular preference from 20 to 50% by weight.

Neutral, nonionic dispersants are very well known to the person skilled in the art. The dispersant in question may comprise, for example, a polyglycol or a derivative thereof.

High molecular mass organic materials particularly suitable for preparing colour filters are known to the person skilled in the art. For example, they may comprise polymers. Preference is given to substantially colourless high molecular mass organic materials, examples being those described later on below.

Judiciously, the amount of high molecular mass organic material is from 10 to 400% by weight, based on the total amount of pigment, preferably from 30 to 200% by weight, and with particular preference from 40 to 100% by weight.

Additionally, and separately from the solid solution of the invention, a quinacridone, quinacridonequinone, dioxazine, indanthrone, indigo, isoviolanthrone, perylene, amino-substituted 1,4-diketo-2,5-diarylpyrrolo[3,4c]pyrrole or alkoxy-substituted Naphtol AS azo pigment may likewise be a constituent of the blue dispersion of the invention. Where the dispersion of the invention is used for a purpose other than as a colour filter, so that the blue colour is no longer essential, it is also possible to admix any desired other pigments, examples being chromatic, white, black, lustrous or dichroic organic, inorganic or metallic pigments, in which case, by virtue of the high colour saturation (chroma) of the solid solutions of the invention, particularly attractive colorations may be produced. The person skilled in the art knows how pigments are to be mixed in order to obtain the desired shades and effects.

The pigment preferably has an average particle size of from 0.01 μm to 0.3 μm, with particular preference from 0.02 μm to 0.2 μm, and with very particular preference from 0.04 μm to 0.1 μm.

Preferably, the majority of the rheology improver is present on the surface of the pigment or separately in the dispersion. Furthermore, surprisingly, it has been found that impurities enclosed in the core of the pigment, for example rheology improver and especially sulfonates, have an adverse effect on the application properties of the dispersion of the invention: filters prepared therefrom are very often too greenish and/or have numerous defect sites (pinholes). To a substantial extent, these problems continue unabated if additional rheology improver is added. Preferably, therefore, either less than 20% by weight of the rheology improver or less than 2% by weight of rheology improver, based on the total amount of pigment, is enclosed in the core.

It is, therefore, also preferred for the starting material used not to comprise copper phthalocyanine which contains significant amounts of a rheology improver or structurally similar compound.

The optical properties of the pigment dispersion of the invention may readily be evaluated on the basis of an approximately 0.4 μm thick coating containing a total of 53.9% by weight of pigment and rheology improver on a transparent glass substrate, whose spectrum is measured at least from 400 to 700 nm (a spectral range of 380 to 780 nm is most suitable). In the case of ε copper phthalocyanine as the host of the pigmentary solid solution, the resultant ratio of the absorption at 500 nm to absorption at 455 nm $$\left(\frac{A_{500}}{A_{455}}\right)$$

is at least 2.0, preferably at least 2.2, and with particular preference at least 2.5. On the other hand, the resulting ratio of the absorption at 500 nm to the absorption at 415 nm $$\left(\frac{A_{500}}{A_{415}}\right)$$

is at least 0.75, preferably at least 0.85, and with particular preference at least 0.95. The coat thickness in this case is indicated for the dried coating. The parameters $$\left(\frac{A_{500}}{A_{455}}\right) \text{ and } \left(\frac{A_{500}}{A_{415}}\right)$$

characterize the potential of the dispersions of the invention more effectively than transmission values, since unlike the latter they are substantially independent of experimental parameters; they exhibit virtually no variation in the concentration range from together in total about 50 to 60% pigment and rheology improver. Suitable methods for preparing coatings starting from pigment dispersions are known per se. Given careful working, it is possible to achieve a transmission of about 90% at the middle of the optimum transmission window.

The dispersion of the invention may be used, for example, to prepare a colour filter which may itself be used in a screen or a display.

The dispersion of the invention may be prepared by conjoint kneading of copper phthalocyanine and guest pigment, it being preferred, for the reasons given above, not to add the rheology improver and, where appropriate, the dispersant until after kneading. Judiciously, the copper phthalocyanine should not be amorphous, and should also by no means be rendered amorphous prior to kneading, in accordance for example with WO-01/04215, since otherwise the coloristics suffer.

If the copper phthalocyanine is predominantly in the ε crystal form, it may nevertheless include other forms, which are converted into the ε form in the course of kneading. In this case, other forms should judiciously be present at most in amounts such that in the x-ray powder diagram their signals do not exceed the principal signals of the ε form at from about 5 to 10° 2θ (CuK$_\alpha$), generally not more than 40% by weight and preferably not more than 20% by weight.

In contrast, any guest pigments for kneading are used preferably in very finely divided form, with particular preference having been rendered amorphous in accordance with WO-01/04215.

Of course, this process is also suitable for dispersions of pure copper phthalocyanine, when no guest pigment is added. In this case, however, it is not possible reliably to predict the crystal phase of the product, since the phase-stabilizing action of the guest pigment and the formation of solid solutions are absent. The colour strength is also significantly lower than in the presence of a guest, though it is still much higher than that of the starting material.

The invention therefore provides a process for preparing a pigment dispersion of the invention, in which unsubstituted copper phthalocyanine, preferably predominantly in the ε crystal form, and also, if desired, a quinacridone, quinacridonequinone, dioxazine, indanthrone, indigo, isoviolanthrone, perylene, amino-substituted 1,4-diketo-2,5-diarylpyrrolo[3,4c]pyrrole or alkoxy-substituted Naphtol AS azo pigment are kneaded with a crystalline inorganic salt or mixture of crystalline inorganic salts and an organic liquid; and a rheology improver selected from the group consisting of quinacridone, dihydroquinacridone, quinacridonequinone, 1,1'-dianthraquinonyl, dioxazine, indanthrone, indigo, isoindolinone, isoviolanthrone, phthalocyanine and 1,4-diketopyrrolo[3,4c]pyrrole cores substituted by groups containing nitrogen or sulfur, and also any desired mixtures thereof, is added.

Preferred rheology improvers are substituted by from 1 to 4 groups —CH$_2$NR$_5$R$_6$, preferably substituted by 2 groups —CH$_2$NR$_5$R$_6$ or mixtures substituted by an average of about 2 groups —CH$_2$NR$_5$R$_6$.

If desired, it is also possible to add, in addition, a neutral nonionic dispersant, preferably in an amount of from 5 to 200% by weight, based on the total amount of pigment, with particular preference from 10 to 80% by weight, and with very particular preference from 20 to 50% by weight.

Judiciously, the crystalline inorganic salt is soluble in the organic liquid to an extent ≦100 mg/l at 20° C., preferably ≦10 mg/l at 20° C., and with particular preference is virtually insoluble at 20° C.

The inorganic salt and also the organic liquid are preferably each soluble to the extent of at least 10 g/100 ml in water. Inorganic salts used are preferably aluminium sulfate, sodium sulfate, calcium chloride, potassium chloride or sodium chloride, with or without water of crystallization, particular preference being given to sodium sulfate, potassium chloride or sodium chloride.

For kneading it is preferred to use a salt having an average particle size of from 5 to 200 μm, with particular preference a salt having an average particle size from 10 to 50 μm.

Particular preference is given to using as the organic liquid a ketone, an ester, an amide, a sulfone, a sulfoxide, a nitro compound or a mono-, bis- or tris-hydroxy-C$_2$–C$_{12}$alkane compound which is substituted by one or two oxo groups and may be esterified with C$_1$–C$_8$alkylcarbonyl or etherified with C$_1$–C$_8$alkyl on one or more hydroxyl groups, or a mixture thereof. As replacement, it is also possible to use alcohols or glycols. With particular preference, the ketone, ester, amide, sulfone, sulfoxide or nitro compound comprises an aliphatic or cycloaliphatic compound.

Preferably, the organic liquid is neutral per se, although acidic or basic impurities in customary small amounts are not disruptive. Illustrative examples of neutral organic liquids, which, however, in no way restrict the invention, are triacetin, dimethylformamide, dimethylacetamide, N-methylpyrrolidone, ethyl methyl ketone, cyclohexanone, diacetone alcohol, butyl acetate, nitromethane, dimethyl sulfoxide and sulfolane. Diacetone alcohol is very particularly preferred.

With preference, the temperature during kneading is from 10 to 60° C. The rotary speed should be set, taking into account the cooling where appropriate, in such a way that the kneaded mass is moved homogeneously under uniform shear and the temperature does not exceed the temperature range of the invention. Instances of local overheating or excessive mechanical stress should as far as possible be avoided. Outstanding results are obtained, for example, in a kneader of capacity 5 l at rotary speeds of from 50 to 150 rpm and kneading times of from 6 to 24 h, these figures by no way being limiting and it being possible for the rotary speeds to be lower, for example in larger apparatus.

After kneading, it is preferred to wash out the inorganic salt and the organic liquid with water, especially demineralized water. Drying is conducted preferably at from −20 to 250° C./10$^{-1}$ to 10$^5$ Pa, with particular preference at from 25 to 100° C./10$^2$ to 10$^5$ Pa or from 100 to 200° C./10$^4$ to 10$^5$ Pa, with very particular preference around 80° C./10$^4$ Pa.

In the course of kneading, the ratio of organic liquid to inorganic salt is preferably from 1 ml:6 g to 3 ml:7 g, and the ratio of organic liquid to the total weight of the inorganic salt and all pigments is from 1 ml:2.5 g to 1 ml:7.5 g.

Certain impurities are known to cause crystal phase transformations. Depending on their amount and identity, these impurities are sometimes difficult to detect by analysis. It is therefore advisable either to use unsubstituted copper phthalocyanine in a pure form (for example α, β or preferably ε) or to check the coloristics of the resulting dispersion on the basis of a coating as indicated above. If starting from copper phthalocyanine predominantly in the ε form, it will commonly be found that any other forms of copper phthalocyanine present will be converted into the ε form.

The invention therefore also provides a process for converting copper phthalocyanine into the ε form by kneading with a crystalline inorganic salt or mixture of crystalline inorganic salts and an organic liquid, wherein the copper phthalocyanine comprises a mixture of different crystal forms in which the ε form is predominant.

Furthermore, in the x-ray powder diagram, all signals but those belonging to the predominant copper phthalocyanine crystal form usually disappear. With particular advantage, monophase solid solutions in the lattice of copper phthalocyanine are obtained which are notable for particularly high fastness properties, in particular an outstanding light fastness.

Preferably, the rheology improver is not added until after the desired particle size has been reached, and with particular preference is not added until after kneading. Where a neutral nonionic dispersant is added, this too is preferably not added until the desired particle size has been reached, and with particular preference not until after kneading.

The dispersion of the invention may further comprise customary solvents in customary amounts.

Solid solutions comprising copper phthalocyanine are novel. They may be used as pigments having good applications properties, such as dispersibility, rheology, heat stability, migration fastness, light fastness and weather fastness, and also colour strength and colour saturation. Applications for these solid solutions include but are not at all limited to colour filters, electrophotography, automotive paint systems and polymer fibers of all kind.

The invention therefore additionally provides a solid solution consisting essentially of copper phthalocyanine and one or more other colorants selected from the group consisting of quinacridone, quinacridonequinone, dioxazine, indanthrone, indigo, isoviolanthrone, perylene, amino-substituted 1,4-diketo-2,5-diarylpyrrolo[3,4c]pyrrole or alkoxy-substituted Naphtol AS azo pigments and any desired mixtures thereof. Where two or more further colorants are present their number is arbitrary, for example from 2 to 100, preferably from 2 to 8, and with particular preference 2 or 3.

Preference is given to a monophase solid solution in the crystal lattice of unsubstituted α, β or ε copper phthalocyanine as the host, comprising as guest a quinacridone, dioxazine, indanthrone, indigo, isoviolanthrone, perylene, amino-substituted 1,4-diketo-2,5-diarylpyrrolo[3,4c]pyrrole or alkoxy-substituted Naphtol AS azo pigment.

In all cases, the amount of further colorants is in particular from 0.1 to 50% by weight, based on the amount of copper phthalocyanine, preferably from 0.5 to 20% by weight, with particular preference from 1 to 10% by weight, and in particular about 3 to 5% by weight.

Outstanding results are obtained in particular with ε copper phthalocyanine as host and indanthrone pigments or dioxazine pigments as guests.

The solid solutions or dispersions of the invention may of course also be used in the mass to pigment high molecular mass organic materials, for example as masterbatches.

The high molecular mass organic material to be coloured in accordance with the invention may be of natural or synthetic origin and commonly has a molecular weight in the range from $10^3$ to $10^8$ g/mol. The said material may, for example, comprise natural resins or drying oils such as rubber or casein, or modified natural substances, such as chlorinated rubber, oil-modified alkyd resins, viscose, cellulose ethers or esters, such as cellulose acetate, cellulose propionate, cellulose acetobutyrate or nitrocellulose, especially fully synthetic organic polymers (both thermosets and thermoplastics), as obtained by addition polymerization, polycondensation or polyaddition, examples being polyolefins such as polyethylene, polypropylene or polyisobutylene, substituted polyolefins such as polymers of vinyl chloride, vinyl acetate, styrene, acrylonitrile or acrylates and/or methacrylates or butadiene, and also copolymers of the abovementioned monomers, especially ABS or EVA.

From the series of the polyaddition resins and polycondensation resins, mention may be made of the condensates of formaldehyde with phenols, known as phenolic resins, and the condensates of formaldehyde with urea, thiourea and melamine, known as amino resins, the polyesters used as paint resins, and indeed both saturated resins, such as alkyd resins, and unsaturated resins, such as maleate resins, and also the linear polyesters and polyamides or silicones.

The high molecular mass compounds mentioned may be present individually or in mixtures, as plastic masses or melts, which may if desired be spun into fibres.

They may also be present in the form of their monomers or in the polymerized state in dissolved form as film formers or binders for coating materials or printing inks, such as linseed oil varnish, nitrocellulose, alkyd resins, melamine resins, urea-formaldehyde resins or acrylic resins.

Pigmentation of the high molecular mass organic substances with the pigmentary solid solutions of the invention takes place, for example, by mixing such a pigment, in the form if desired of masterbatches or dispersions, into these substrates using roll mills, mixers or milling apparatus. In general, the pigmented material is subsequently brought into the desired ultimate form by techniques known per se such as calendering, compression moulding, extrusion, spreading, casting or injection moulding. In order to produce non-rigid mouldings or to reduce their brittleness it is often desirable to incorporate what are known as plasticizers into the high molecular mass compounds prior to their shaping. Examples of such plasticizers which may be used are esters of phosphoric acid, phthalic acid or sebacic acid. In the process of the invention, the plasticizers may be incorporated into the polymers before or after the incorporation of the pigmentary colorant. A further possibility, in order to obtain different hues, is to add fillers and/or other colouring constituents such as white, chromatic or black pigments, and also effect pigments, in the particular desired amount to the high molecular mass organic materials in addition to the pigment compositions.

For pigmenting coating materials and printing inks, the high molecular mass organic materials and the pigmentary solid solutions of the invention, alone or together with additives such as fillers, other pigments, siccatives or plasticizers, are finely dispersed or dissolved in, generally, an organic and/or aqueous solvent or solvent mixture. One possible procedure here is to disperse or dissolve the individual components alone, or else two or more together, and only then to combine all of the components.

A further embodiment of the invention therefore additionally provides mass-coloured high molecular mass organic material comprising (a) from 0.05 to 70% by weight, based on the sum of (a) and (b), of a solid solution of the invention, and (b) from 99.95 to 30% by weight, based on the sum of (a) and (b), of a high molecular mass organic material.

Said material may comprise either a ready-to-use composition or an article formed therefrom, and also a masterbatch, in the form of granules, for example. If desired, the high molecular mass organic material coloured in accordance with the invention may further comprise customary additives, for example stabilizers.

A further embodiment therefore additionally provides a process for colouring high molecular mass organic material in the mass, which comprises incorporating therein a solid solution or pigment dispersion of the invention, for example by mixing the high molecular mass organic material with a pigment composition of the invention, optionally in the form of a masterbatch, in a manner known per se and processing this mixture. The pigmentations are notable in particular for outstanding transparency combined with high colour saturation (chroma) and good fastness properties.

The examples which follow illustrate the invention without restricting its scope (unless specified otherwise, "%" always relates to % by weight):

EXAMPLE 1

A laboratory kneader with a capacity of 1 l is charged with 58.2 g of Fastogen® Blue EP 7 (Pigment Blue 15:6, DIC), 1.8 g of carbazole violet (Pigment Violet 23) rendered amorphous in accordance with WO-01/04215, 240 g of sodium chloride and 70 ml of diacetone alcohol and the rotary speed is set to 100 rpm. The walls of the kneader are cooled to 20° C. so that the temperature in the mass does not exceed 30° C. After 7 hours, 150 ml of deionized water are added slowly, the resulting mixture is discharged onto a Büchner funnel and the material in the funnel is washed with water until the washing water is salt-free. The product is dried at 80° C./3–10$^3$ Pa for 15 hours, then sieved through a sieve with a mesh size of 0.4 mm. This gives a solid solution whose x-ray powder diagram corresponds to the pure ε crystal phase of unsubstituted copper phthalocyanine.

EXAMPLE 2

The procedure of example 1 is repeated, but using 2.4 g of carbazole violet. This gives a solution whose x-ray powder diagram corresponds to the pure ε crystal phase of unsubstituted copper phthalocyanine.

EXAMPLE 3

The procedure of example 2 is repeated but using Cromophtal® Blue A3R (Pigment Blue 60, Ciba Spezialitatenchemie AG) instead of carbazole violet. This gives a solid solution whose x-ray powder diagram corresponds to the pure ε crystal phase of unsubstituted copper phthalocyanine.

EXAMPLE 4

A laboratory kneader with a capacity of 1 l is charged with 44.0 g of Heliogen® Blue D6700-T (Colour Index Pigment Blue 15:6, BASF), 1.36 g of carbazole violet (Colour Index Pigment Violet 23), rendered amorphous in accordance with WO-01/04215, 4.40 g of Solsperse® 5000 (blue copper phthalocyanine derivative, Avecia), 240 g of sodium chloride and 70 ml of diacetone alcohol and the rotary speed is set to 100 rpm. The walls of the kneader are cooled to 25° C. so that the temperature in the mass does not exceed 40° C. After 8 hours, 150 ml of deionized water are added slowly, the resulting mixture is discharged onto a Büchner funnel and the material in the funnel is washed with water until the washing water is salt-free. The product is dried at 80° C./3–10$^3$ Pa for 15 hours, then sieved through a sieve with a mesh size of 0.4 mm. This gives a solid solution whose x-ray powder diagram corresponds to the pure ε crystal phase with unsubstituted copper phthalocyanine.

EXAMPLE 5

The procedure of example 1 is repeated but using Heliogen® Blue D6700-T (Colour Index Pigment Blue 15:6, BASF) instead of Fastogen® Blue EP 7. This gives a solid solution whose x-ray powder diagram corresponds to the pure ε crystal phase of unsubstituted copper phthalocyanine.

EXAMPLE 6

The procedure of example 5 is repeated but using Cinquasia® Violet R NRT-201-D (Colour Index Pigment Violet 19, Ciba specialty Chemicals Inc.) instead of carbazole violet. This gives a solid solution whose x-ray powder diagram corresponds to the pure ε crystal phase of unsubstituted copper phthalocyanine.

EXAMPLE 7

The procedure of example 1 is repeated but using 60.0 g Fastogen® Blue EP 7 and no carbazole violet. This gives a fine pigment whose x-ray powder diagram corresponds to the pure ε crystal phase of unsubstituted copper phthalocyanine.

EXAMPLE 8

The procedure of example 5 is repeated but using Heliogen® Blue D6700-T which has been rendered amorphous in accordance with WO-01/04215. This gives a solid solution whose x-ray powder diagram corresponds to the pure ε crystal phase of unsubstituted copper phthalocyanine.

EXAMPLE 9

A laboratory kneader with a capacity of 1 l is charged with 45.0 g of Heliogen® Blue K6902 (Pigment Blue 15:1/BASF; α crystal form), 5.0 g of finely crystalline carbazole violet (Pigment Violet 23), 200 g of sodium chloride and 60 ml of diacetone alcohol and the rotary speed is set to 100 rpm. The walls of the kneader are cooled to 40° C. After 8 hours, 150 ml of deionized water are added slowly, the resulting mixture is discharged onto a Büchner funnel and the material in the funnel is washed with water until the washing water is salt-free. The product is dried at 80° C./3–10$^3$ Pa for 15 hours, then sieved through a sieve with a mesh size of 0.4 mm. This gives a solid solution whose x-ray powder diagram corresponds to the pure ε crystal phase with unsubstituted copper phthalocyanine. The product has very attractive coloristics and good fastness properties in coating materials, for example dichroic or metallically lustrous automotive finishes (containing aluminium flakes and/or mica particles, preferably 2- or 3-coat).

EXAMPLE 10

A laboratory kneader with a capacity of 1 l is charged with 45.0 g of Heliogen® Blue S7084 (Pigment Blue 15:3/BASF; β crystal form), 5.0 g of finely crystalline carbazole violet (Pigment Violet 23), 200 g of sodium chloride and 60 ml of diacetone alcohol and the rotary speed is set to 100 rpm. The walls of the kneader are cooled to 40° C. After 8 hours, 150 ml of deionized water are added slowly, the resulting mixture is discharged onto a Büchner funnel and the material in the funnel is washed with water until the washing water is salt-free. The product is dried at 80° C./3–10³ Pa for 15 hours, then sieved through a sieve with a mesh size of 0.4 mm. This gives a solid solution whose x-ray powder diagram corresponds to the pure ε crystal phase with unsubstituted copper phthalocyanine. The product has very attractive coloristics and good fastness properties in coating materials, for example dichroic or metallically lustrous automotive finishes.

EXAMPLE 11

In a 100 ml glass vessel containing 83.3 g of zircon ceramic beads, 2.8 g of the product from example 1, 0.28 g of Solsperse® 5000, 4.10 g of Disperbyk® 161 (dispersant/BYK Chemie: 30% solution of a high molecular mass block copolymer having groups with pigment affinity, in 1:6 n-butyl acetate/1-methoxy-2-propyl acetate) and 14.62 g of propylene glycol monomethyl ether acetate (MPA, CAS Reg. N° 108-65-6), these components are stirred at 23° C. with a Dispermat at 1000 rpm for 10 minutes and at 3000 rpm for 180 minutes. Following the addition of 4.01 g of acrylic polymer binder (35% solution in MPA) at room temperature, stirring is continued at 3000 rpm for 30 minutes. After the beads have been separated off, the dispersion is diluted with an equal amount of MPA. A glass substrate (Corning Type 1737-F) is coated with this dispersion in a spin-coating apparatus and is spun at 1000 rpm for 30 s. The drying of the coat is carried out at 100° C. for 2 minutes and at 200° C. for 5 minutes on a hotplate. The coat thickness achieved is 0.4 µm. FIG. 1 shows the transmission spectrum of this colour filter with a maximum at about 455 nm. The trichromatic coordinates (with standard C as backlighting) are:

x=0.154/y=0.177/Y=26.98%.

EXAMPLES 12–15

The procedure of example 11 is repeated but using in each case a product from examples 2 to 5 instead of the product from example 1.

EXAMPLE 16

The procedure of example 11 is repeated but using in each case a product from example 6 instead of the product from example 1.

EXAMPLES 17–18

The procedure of example 11 is repeated but using in each case a product from examples 7 to 8 instead of the product from example 1.

EXAMPLE 19

The procedure of example 11 is repeated but using the product from example 8 instead of the product from example 1. The trichromatic coordinates (with standard C as backlighting) are: x=0.154/y=0.181/Y=26.11%.

EXAMPLE 20

The procedure of example 11 is repeated but using the product from example 9 instead of the product from example 1. The trichromatic coordinates (with standard C as backlighting) are: x=0.152/y=0.201/Y=30.73%.

EXAMPLE 21

9 g of the product according to example 5 is dispersed in 90 ml of water with 10 ml of a 1 M HCl solution. 1 g of bis-dimethylaminomethyl-copperphthalocyanine is added and stirred for 1 hour. The mixture is then neutralized by slowly adding 1 N NaOH solution and again stirred for 1 hour. After that the mixture is filtrated, washed and dried in vacuum at 80–90° C./3–10³ Pa for 15 hours.

EXAMPLE 22

The procedure of example 21 is repeated, but using 1 g of bis-phthalimido-methyl-copperphthalocyanine instead of bis-dimethylaminomethyl-copperphthalocyanine.

EXAMPLE 23

The procedure of example 21 is repeated, but using 1 g of mono-diethylamino-propylsulfonamid-copperphthalocyanine instead of bis-dimethylaminomethyl-copperphthalo-cyanine.

EXAMPLE 24

The procedure of example 21 is repeated, but using only 0.5 g of bis-dimethyl-aminomethyl-copperphthalocyanine and additionally 0.5 g of the product obtainable according to example 2 of U.S. Pat. No. 5,334,727.

EXAMPLE 25

The procedure of example 21 is repeated, but using only 0.5 g of bis-dimethyl-aminomethyl-copperphthalocyanin and additionally 0.5 g of the product obtainable according to example 23 of EP-A-1,026,207.

EXAMPLE 26

The procedure of example 11 is repeated but using 3.08 g of the product according to example 21 and no Solsperse® 5000. The coat thicknesses achieved are all below 0.4 µm. The trichromatic coordinates (with standard C as back lighting) are:

x=0.153/y=0.177/Y=26.44%.

EXAMPLE 27–30

The procedure of example 26 is repeated but using the products according to examples 22 to 25 instead of the product according to examples 21. The coat thicknesses achieved are all below 0.4 µm. The trichromatic coordinates (with standard C as back lighting) are respectively:

x=0.154/y=0.179/Y=27.05% (example 27)

x=0.156/y=0.183/Y=27.27% (example 28)

x=0.156/y=0.176/Y=26.43% (example 29)

x=0.155/y=0.179/Y=26.91% (example 30).

EXAMPLE 31

The coatings according to examples 11, 16 and 26 are compared with respect to the number of pin-holes per unit of surface. The coating according to example 16 has fewer pin-holes than that of example 11, while the coating according to example 26 is virtually free of pin-holes.

EXAMPLE 32

The impurities in Fastogen® Blue EP 7 (Pigment Blue 15:6, DIC) and Heliogen® Blue D6700-T (Colour Index Pigment Blue 15:6, BASF) are comparatively determined by Matrix Assisted Laser Desorption ionisation—Time Of Fly (MALDI—TOF).

EXAMPLE 33

The procedure of example 5 is repeated but using 60.0 g of Heliogen® Blue D6700-T and no carbazole violet. The product's electric resistivity is about 5% lower than that of example 5. The colour strength in paint is 92% of that of the product of example 5.

EXAMPLE 34

The procedure of example 5 is repeated but using 57.0 g of Heliogen® Blue D6700-T and 3.00 g of carbazole violet. The colour strength in paint is 101% of that of the product of example 5.

EXAMPLE 35

The procedure of example 5 is repeated but using 54.0 g of Heliogen® Blue D6700-T and 6.00 g of carbazole violet. The colour strength in paint is 116% of that of the product of example 5.

EXAMPLE 36

The product of example 33 is incorporated in a usual polyester/cellulose acetobutyrate paint in white reduction, at a weight ratio of 10:90 with $TiO_2$ pigment. As compared with a coating made from the starting material of example 5, the hue is about the same but the chroma is higher (CIE-L*C*h:$\Delta H^* = -0.4$, $\Delta C^* = +2.0$).

EXAMPLE 37

The procedure of example 36 is repeated but using the product of example 34 instead of the product of example 5. As compared with the coating of example 36, the hue is much redder while the chroma is surprisingly just as high ($\Delta H^* = +5.4$, $\Delta C^* = +0.0$). The colour purity is highly advantageous, particularly for designing very attractive car shades.

What is claimed is:

1. A pigment dispersion comprising a pigment, from 2 to 20% by weight of a rheology improver and from 10 to 400% by weight of a high molecular mass organic material, each based on the total amount of pigment, in which the pigment is a solid solution whose host pigment is unsubstituted copper phthalocyanine and whose guest pigment is a quinacridone, quinacridonequinone, dioxazine, indanthrone, indigo, isoviolanthrone, perylene, amino-substituted 1,4-diketo-2,5-diarylpyrrolo[3,4c]pyrrole- or alkoxy-substituted Naphtol AS azo pigment, the amount of guest pigment being from 0.1 to 50% by weight, based on the amount of copper phthalocyanine; and the rheology improver is selected from the group consisting of quinacridone, dihydroquinacridone, quinacridonequinone, 1,1'-dianthraquinonyl, dioxazine, indanthrone, indigo, isoindolinone, isoviolanthrone, phthalocyanine, 1,4-diketopyrrolo[3,4c]pyrrole cores substituted by groups containing nitrogen or sulfur and mixtures thereof.

2. A pigment dispersion according to claim 1, in which the amount of guest pigment is from 0.5 to 20% by weight, based on the amount of copper phthalocyanine.

3. A pigment dispersion according to claim 1, wherein the rheology improver comprises a core substituted by 1 to 4 groups selected from the group consisting of —$SO_3H$, —$SO_2NR_3R_6$, —$SO_2$—$C_1$–$C_{10}$alkylene-$NR_5R_6$, and —$SO_3^-M^+$, where $M^+$ is $^+NR_1R_2R_3R_4$ or an alkali metal cation or half an alkaline earth metal cation and $R_1$ to $R_6$ independently of one another are hydrogen, $C_1$–$C_{30}$alkyl, $C_5$–$C_{24}$cycloalkyl, $C_2$–$C_{30}$alkenyl, $C_7$–$C_{30}$arylalkyl, $C_6$–$C_{18}$aryl, [$C_2$–$C_5$alkylene-O]$_{1-10}$H, [$C_2$–$C_5$alkylene-O]$_{1-10}$$C_1$–$C_5$alkyl, [$C_2$–$C_5$alkylene-NH]$_{1-10}$H, [$C_2$–$C_5$alkylene-NH]$_{1-10}$$C_1$–$C_5$alkyl,

—$CH_2NR_5R_6$,

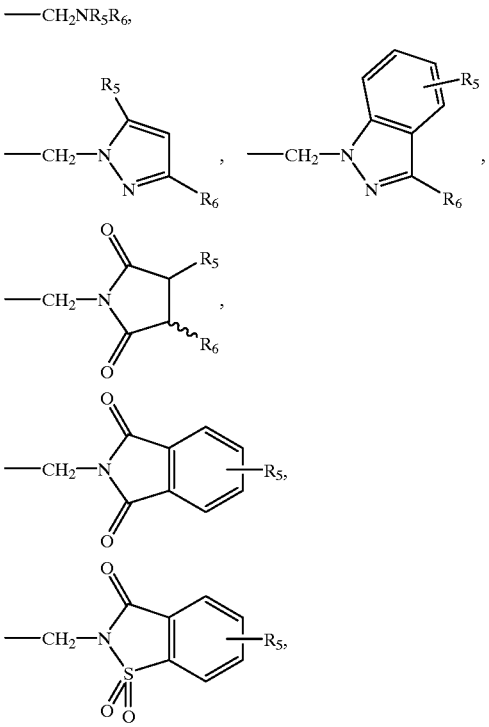

—$NHSO_2NR_5R_6$, —$N(C_1$–$C_5alkyl)SO_2NR_5R_6$, —$NHSO_2$—$C_1$–$C_{10}$alkylene-$NR_5R_6$, —$N(C_1$–$C_5alkyl)$-$C_1$–$C_{10}$alkylene-$SO_2NR_5R_6$, —$NHCONR_5R_6$, —$N(C_1$–$C_5alkyl)CONR_5R_6$, —$NHCO$—$C_1$–$C_{10}$alkylene-$NR_5R_6$ or —$N(C_1$–$C_5alkyl)$-$C_1$–$C_{10}$alkylene-$CONR_5R_6$.

4. A pigment dispersion according to claim 1, wherein the amount of rheology improver is from 4 to 15% by weight, based on the total amount of pigment.

5. A pigment dispersion according to claim 1, wherein the amount of high molecular mass organic material is from 30 to 200% by weight, based on the total amount of pigment.

6. A pigment dispersion according to claim 1, further comprising a neutral nonionic dispersant in an amount of from 5 to 200% by weight, based on the total amount of pigment.

7. A pigment dispersion according to claim 1, further comprising a quinacridone, quinacridonequinone, dioxazine, indanthrone, indigo, isoviolanthrone, perylene, amino-substituted 1,4-diketo-2,5-diarylpyrrolo[3,4c]pyrrole or alkoxy-substituted Naphtol AS azo pigment separately from the solid solution.

8. A pigment dispersion according to claim 1, wherein a major part of the rheology improver is present on the pigment or separately in the dispersion.

9. A pigment dispersion according to claim 1, in which the ratio of the absorption at 500 nm to the absorption at 455 nm in a 0.4 μm thick coating prepared from the pigment dispersion and containing a total of 53.9% by weight of pigment and rheology improver on a transparent glass substrate is at least 2.0.

10. A pigment dispersion according to claim 1, in which the ratio of the absorption at 500 nm to the absorption at 415 nm in a 0.4 μm thick coating prepared from the pigment dispersion and containing a total of 53.9% by weight of pigment and rheology improver on a transparent glass substrate is at least 0.75.

11. A pigment dispersion according to claim 1, wherein unsubstituted copper phthalocyanine is present in its α, β or ε crystal form.

12. A pigment dispersion according to claim 2, in which the amount of guest pigment is from 1 to 3% by weight, based on the amount of copper phthalocyanine.

13. A pigment dispersion according to claim 3, wherein the rheology improver comprises a core substituted by from 1 to 4 groups —$SO_3^-M^+$.

14. A pigment dispersion according to claim 4, wherein the amount of rheology improver is from 6 to 12% by weight, based on the total amount of pigment.

15. A pigment dispersion according to claim 5, wherein the amount of high molecular mass organic material is from 40 to 100% by weight, based on the total amount of pigment.

16. A pigment dispersion according to claim 6, wherein the amount of neutral nonionic dispersant is from 10 to 80% by weight, based on the total amount of pigment.

17. A pigment dispersion according to claim 16, wherein the amount of neutral nonionic dispersant is from 20 to 50% by weight, based on the total amount of pigment.

18. A pigment dispersion according to claim 9, in which the ratio of the absorption at 500 nm to the absorption at 455 nm is at least 2.2.

19. A pigment dispersion according to claim 18, in which the ratio of the absorption at 500 nm to the absorption at 455 nm is at least 2.5.

20. A pigment dispersion according to claim 10, in which the ratio of the absorption at 500 nm to the absorption at 415 nm is at least 0.85.

21. A pigment dispersion according to claim 20, in which the ratio of the absorption at 500 nm to the absorption at 415 nm is at least 0.95.

22. A pigment dispersion according to claim 11, wherein unsubstituted copper phthalocyanine is present in its ε crystal form.

23. A process for colouring high molecular weight mass organic material in the mass, which comprises incorporating therein a pigment dispersion according to claim 1.

24. A solid solution consisting essentially of copper phthalocyanine and from 0.1 to 50% by weight, based on the amount of copper phthalocyanine, of one or more further colorants selected from the group consisting of quinacridone, quinacridonequinone, dioxazine, indanthrone, indigo, isoviolanthrone, perylene, amino-substituted 1,4-diketo-2,5-diarylpyrrolo[3,4c]pyrrole, alkoxy-substituted Naphtol AS azo pigments and mixtures thereof.

25. A solid solution according to claim 24, which is a monophase solid solution having unsubstituted α, β or ε copper phthalocyanine as host and comprising as guest a quinacridone, quinacridonequinone, dioxazine, indanthrone, indigo, isoviolanthrone, perylene, amino-substituted 1,4-diketo-2,5-diarylpyrrolo[3,4c]pyrrole or alkoxy-substituted Naphtol AS azo pigment.

26. A solid solution according to claim 24, wherein the amount of further colorants is from 0.5 to 20% by weight, based on the amount of copper phthalocyanine.

27. A solid solution according to claim 26, wherein the amount of further colorants is from 1 to 10% by weight, based on the amount of copper phthalocyanine.

28. A solid solution according to claim 27, wherein the amount of further colorants is from 3 to 5% by weight, based on the amount of copper phthalocyanine.

29. A solid solution according to claim 24, wherein copper phthalocyanine is in the ε crystal form and the further colorant is a dioxazine.

30. A solid solution according to claim 24, wherein copper phthalocyanine is in the ε crystal form and the further colorant is an indanthrone.

31. A solid solution according to claim 25, wherein the host is unsubstituted ε copper phthalocyanine.

32. A mass-coloured high molecular mass organic material comprising (a) from 0.05 to 70% by weight based on the sum of (a) and (b), of a solid solution according to claim 24 or 25, and (b) from 99.95 to 30% by weight, based on the sum of (a) and (b), of a high molecular mass organic material.

33. A process for colouring high molecular mass organic material in the mass, which comprises incorporating therein a solid solution according to claim 24.

34. A process for preparing a pigment dispersion, in which unsubstituted copper phthalocyanine, and also, optionally, a quinacridone, quinacridonequinone, dioxazine, indanthrone, indigo, isoviolanthrone, peiylene, amino-substituted 1,4-diketo-2,5-diarylpyrrolo[3,4c]pyrrole or alkoxy-substituted Naphtol AS azo pigment are kneaded with a crystalline inorganic salt or mixture of crystalline inorganic salts and an organic liquid; and a rheology improver selected from the group consisting of quinacridone, dihydroquinacridone, quinacridonequinone, 1,1'-dianthraquinonyl, dioxazine, indanthrone, indigo, isoindolinone, isoviolanthrone, phthalocyanine, 1,4-diketo-pyrrolo[3,4c]pyrrole cores substituted by groups containing nitrogen or sulfur and mixtures thereof, is added.

35. A process according to claim 34, wherein a pigment dispersion is obtained which consists essentially of copper phthalocyanine and from 0.1 to 50% by weight, based on the amount of copper phthalocyanine, of one or more further colorants selected from the group consisting of quinacridone, quinacridonequinone, dioxazine, indanthrone, indigo, isoviolanthrone, perylene, amino-substituted 1,4-diketo-2,5-diarylpyrrolo[3,4c]pyrrole, alkoxy-substituted Naphtol AS azo pigments and mixtures thereof.

36. A process according to claim 34, wherein the ratio of organic liquid to inorganic salt is from 1 ml:6 g to 3 ml:7 g, and the ratio of organic liquid to the total weight of inorganic salt and all pigments is from 1 ml:2.5 g to 1 ml:7.5 g.

37. A process according to claim 34 or 35 further comprising the step of converting a copper phthalocyanine having a crystal form different from the ε form into the ε form by kneading the copper phthalocyanine having a crystal form different from the ε form in mixture with a predominant amount of copper phthalocyanine in the ε form with a crystalline inorganic salt or a mixture of crystalline inorganic salts and an organic liquid.

38. A process according to claim 34, in which unsubstituted copper phthalocyanine is predominantly in the ε crystal form.

39. A process according to claim 34, wherein a pigment dispersion is obtained which comprises a pigment, from 2 to 20% by weight of a rheology improver and from 10 to 400% by weight of a high molecular mass organic material, each based on the total amount of pigment, in which the pigment is a solid solution whose host pigment is unsubstituted copper phthalocyanine and whose guest pigment is a quinacridone, quinacridonequinone, dioxazine, indanthrone, indigo, isoviolanthrone, perylene, amino-substituted 1,4-diketo-2,5-diarylpyrrolo[3,4c]pyrrole- or alkoxy-substituted Naphtol AS azo pigment, the amount of guest pigment being from 0.1 to 50% by weight, based on the amount of copper phthalocyanine; and the rheology improver is selected from the group consisting of quinacridone, dihydroquinacridone, quinacridonequinone, 1,1'-dianthraquinonyl, dioxazine, indanthrone, indigo, isoindolinone, isoviolanthrone, phthalocyanine, 1,4-diketopyrrolo[3,4c]pyrrole cores substituted by groups containing nitrogen or sulfur and mixtures thereof.

40. A colour filter comprising a layer comprising a rheology improver, a high molecular mass organic material and a solid solution pigment whose host pigment is unsubstituted copper phthalocyanine and whose guest pigment is a quinacridone, quinacridonequinone, dioxazine, indanthrone, indigo, isoviolanthrone, perylene, amino-substituted 1,4-diketo-2,5-diarylpyrrolo[3,4c]pyrrole- or alkoxy-substituted Naphtol AS azo pigment, the amount of guest pigment being from 0.1 to 50% by weight, based on the amount of copper phthalocyanine.

\* \* \* \* \*